(12) United States Patent
Smelyansky

(10) Patent No.: US 9,055,141 B2
(45) Date of Patent: Jun. 9, 2015

(54) DISTINCTIVE RINGING

(75) Inventor: Vladimir Smelyansky, Glenview, IL (US)

(73) Assignee: Vladimir Smelyansky, Glenview, IL (US)

(*) Notice: Subject to any disclaimer, the term of this patent is extended or adjusted under 35 U.S.C. 154(b) by 430 days.

(21) Appl. No.: 13/102,675

(22) Filed: May 6, 2011

(65) Prior Publication Data

US 2011/0317821 A1    Dec. 29, 2011

Related U.S. Application Data

(60) Provisional application No. 61/358,258, filed on Jun. 24, 2010.

(51) Int. Cl.
| | |
|---|---|
| H04M 1/00 | (2006.01) |
| H04M 3/00 | (2006.01) |
| H04M 7/00 | (2006.01) |
| H04M 3/02 | (2006.01) |
| H04M 3/436 | (2006.01) |
| H04L 12/28 | (2006.01) |
| H04M 3/42 | (2006.01) |
| H04M 3/533 | (2006.01) |

(52) U.S. Cl.
CPC ......... *H04M 7/0069* (2013.01); *H04L 12/2838* (2013.01); *H04M 3/02* (2013.01); *H04M 3/42314* (2013.01); *H04M 3/4365* (2013.01); *H04M 3/533* (2013.01); *H04M 2250/66* (2013.01)

(58) Field of Classification Search
CPC .... H04M 1/82; H04M 19/04; H04M 3/42017
USPC .................. 379/372, 373.01, 373.02, 374.01, 379/374.02, 375.01
See application file for complete search history.

(56) References Cited

U.S. PATENT DOCUMENTS

| | | | |
|---|---|---|---|
| 5,911,123 A | 6/1999 | Shaffer et al. | |
| 7,127,239 B2 | 10/2006 | Ogman et al. | |
| 7,787,602 B2 | 8/2010 | Pearson et al. | |
| 8,311,532 B2 | 11/2012 | Waller | |
| 2005/0143054 A1* | 6/2005 | Fogel | ............................ 455/415 |
| 2005/0180554 A1* | 8/2005 | Alston et al. | ............. 379/207.16 |
| 2007/0115946 A1 | 5/2007 | Schaade et al. | |
| 2008/0013540 A1 | 1/2008 | Gast | |

(Continued)

OTHER PUBLICATIONS

Non-final Office Action dated Mar. 14, 2013 received in U.S. Appl. No. 13/102,781.

(Continued)

*Primary Examiner* — Simon King
(74) *Attorney, Agent, or Firm* — Smith, Gambrell & Russell, LLP

(57) ABSTRACT

A Family Branch Exchange (FBX) overcomes limitations of conventional residential telephone technology to inexpensively provide more useful and advanced residential telephone services. For example, a method of providing distinctive ringing comprises receiving, at a service provider system connected to a telephone network and optionally to a data network, a call from a calling party to a user of the service provider system, playing, from the service provider system to the calling party, a message indicating a plurality of choices from which to select, receiving, at the service provider system, the calling party's selection, and transmitting, from the service provider system, a message indicating a ring tone or ring type to be used based on the calling party's selection.

24 Claims, 11 Drawing Sheets

(56) References Cited

U.S. PATENT DOCUMENTS

| | | | |
|---|---|---|---|
| 2008/0043727 A1 | 2/2008 | Smitheimer | |
| 2008/0043968 A1* | 2/2008 | Jain et al. | 379/211.02 |
| 2009/0067415 A1 | 3/2009 | Liu et al. | |
| 2009/0097472 A1* | 4/2009 | Hossain | 370/352 |
| 2009/0103691 A1 | 4/2009 | Hume et al. | |
| 2009/0168787 A1* | 7/2009 | Ansari et al. | 370/401 |
| 2009/0190573 A1 | 7/2009 | Siegel et al. | |
| 2012/0036552 A1 | 2/2012 | Dare et al. | |

OTHER PUBLICATIONS

Non-final Office Action dated Apr. 22, 2014 received in U.S. Appl. No. 13/102,781.

Final Office Action dated Jan. 27, 2015 received in U.S. Appl. No. 13/102,781.

* cited by examiner

DISTINCTIVE RINGING

CROSS-REFERENCE TO RELATED APPLICATIONS

This application claims the benefit of Provisional Application No. 61/358,258, filed Jun. 24, 2010, the contents of which are incorporated herein in their entirety.

BACKGROUND OF THE INVENTION

1. Field of the Invention

The present invention relates to systems, methods, and computer program products for providing advanced residential telephone services.

2. Description of the Related Art

Families are faced with increasing choices associated with communication services and devices. While costs for individual services and devices have generally declined in price, when bundled together the cost per household for basic communication services has actually increased in recent decades. Until recently, basic telephone service (POTS) remained the bedrock communication tool in every American household as the voice-grade telephone service. With the increased adoption of broadband services, VoIP is expected to become a primary means of residential communication. In the case of most residential users, the wiring which brings communication to the house, "the last mile", usually has one or two lines and most phones are single line analog devices. Any household with multiple residents experiences the annoyance of answering the phone and realizing it is for someone else. They must call someone else, take down a message, or ask the calling party to call back and leave a message on a voice mail system, if it exists. Or, the called party may not be reachable on the residential line even though they could be reached on their cell phone. Conventional residential telephone technology has not advanced in terms of overcoming these and other common limitations and annoyances.

A need arises for a technique by which limitations of conventional residential telephone technology may be overcome to inexpensively provide more useful and advanced residential telephone services.

SUMMARY OF THE INVENTION

A Family Branch Exchange (FBX) overcomes limitations of conventional residential telephone technology to inexpensively provide more useful and advanced residential telephone services. For example, FBX, any calling party has the ability to identify and choose which specific person inside the household they are trying to reach. FBX functionality allows for easy call screening that benefits both the calling party and the called party. Because of its ease of use, FBX facilitates communication between family members no matter where they are in the world. Any subscriber to the FBX system can initiate or receive a call simply by dialing one or two digits and the call will be free, when routed over IP, or very inexpensive, in many other cases when Public Switched Telephone Network (PSTN) termination is needed, including international calls.

For example, a method of providing distinctive ringing comprises receiving, at a service provider system connected to a telephone network, a call from a calling party to a user of the service provider system, playing, from the service provider system to the calling party, a message indicating a plurality of choices from which to select, receiving, at the service provider system, the calling party's selection, and transmitting, from the service provider system, a message indicating a ring tone or ring type to be used based on the calling party's selection. The received call is received at the service provider system from the telephone network. The plurality of choices from which to select represent a plurality of people. The message indicating a ring tone or ring type is transmitted over the telephone network over an analog telephone line to a telephone. The service provider system is further connected to a data network. The received call is received at the service provider system from the data network. The plurality of choices from which to select represent a plurality of people. The message indicating a ring tone or ring type is transmitted over the data network to an adapter that connects an analog telephone line to the data network.

As another example, a method of providing automatic call forwarding comprises receiving, at a service provider system connected to a telephone network, a call from user premises, wherein the person to whom the call is to be placed is associated with the user premises, the call including dialing information indicating a person to whom the call is to be placed, retrieving, at the service provider system, destination information for the indicated person, and forwarding, from the service provider system, the call to at least one destination indicated by the destination information. The received call is received at the service provider system from the telephone network. The dialing information is an extension number indicating a person at the user premises. The destination information includes at least one telephone number. The telephone number is a cell phone number or a landline telephone number at a location other than the user premises. The service provider system is further connected to a data network. The received call is received at the service provider system from the data network. The dialing information is an extension number indicating a person at the user premises. The destination information includes at least one telephone number, network address, or network name. The telephone number is a cell phone number or a landline telephone number at a location other than the user premises.

As another example, a method of providing voicemail service comprises receiving, at a service provider system connected to a data network and to a telephone network, an access to voicemail from user premises, checking, at the service provider system, whether there are any new voicemail messages in any voicemail box associated with the user premises, and transmitting, from the service provider system, a message to turn on a new voicemail message indication when there is a new voicemail message in any voicemail box associated with the user premises. The method further comprises transmitting, from the service provider system, a message to turn off a new voicemail message indication when there are no new voicemail messages in any voicemail box associated with the user premises. The message indicating the new voicemail message is transmitted over the data network to an adapter that connects an analog telephone line to the data network.

As another example, a method of providing voicemail service comprises receiving, at a service provider system connected to a data network and to a telephone network, an access to voicemail from a user at user premises, checking, at the service provider system, the statuses of all voicemail boxes associated with the user premises to determine a number of new voicemail messages in each voicemail box, building, at the service provider system, a voice message indicating which voicemail boxes have new messages, and playing, from the service provider system to the user, the voice message indicating which voicemail boxes have new messages. The checking step further comprises determining a number of old and saved voicemail messages in each voicemail box, and the building step further comprises generating the voice message based on the number of old and saved voicemail messages in each voicemail box.

As another example, a method of providing support services comprises receiving, at a service provider system connected to a data network and to a telephone network, an access to voicemail from a user at user premises, checking, at the service provider system, the statuses of all voicemail boxes associated with the user premises to determine a number of new voicemail messages in each voicemail box, building, at the service provider system, a voice message indicating which voicemail boxes have new messages, and playing, from the service provider system to the user, the voice message indicating which voicemail boxes have new messages.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

A Family Branch Exchange (FBX) overcomes limitations of conventional residential telephone technology to inexpensively provide more useful and advanced residential telephone services. For example, FBX, any calling party has the ability to identify and choose which specific person inside the household they are trying to reach. FBX functionality allows for easy call screening that benefits both the calling party and the called party. Because of its ease of use, FBX facilitates communication between family members no matter where they are in the world. Any subscriber to the FBX system can initiate or receive a call simply by dialing one or two digits and the call will be free, when routed over IP, or very inexpensive, in many other cases when Public Switched Telephone Network (PSTN) termination is needed, including international calls.

FBX is a modified and greatly simplified PBX/key system with special functionality to work over limited number (one in most cases) of analog phone lines with analog end user handsets (phones). FBX can be a single location or multi-location installation. It may have one or many PSTN phone numbers, such as one number per location based on subscriber preference.

Figure 1:
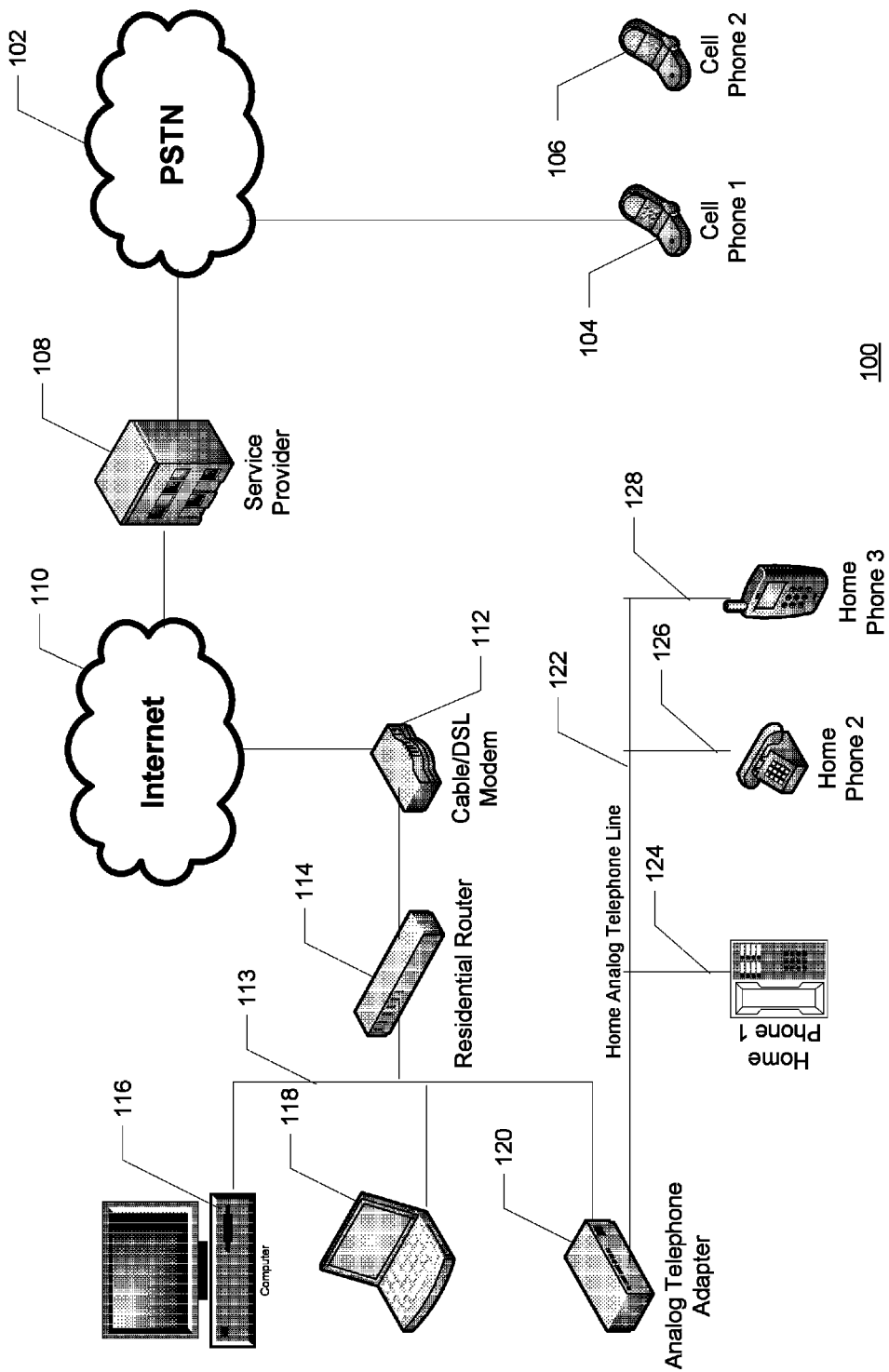
FIG. 1 is an exemplary block diagram of a system in which FBX may be implemented.

An exemplary system 100, in which FBX may be implemented, is shown in FIG. 1. System 100 includes the Public Switched Telephone Network (PSTN) 102, which includes any and all publicly available telecommunications networks, including analog and digital wired telecommunications networks and analog and digital wireless telecommunications networks. PSTN 102 provides communicative connectivity to wired phones 104 and wireless phones 106. Communicatively connected to PSTN 102 is service provider system 108, which, in this example, is used to provide the FBX functionality. Service provider system 108 may include apparatus such as telephone switches, gateways, etc. Service provider system 108 is also communicatively connected to one or more data networks, such as the Internet 110. Although, in this example, the Internet is shown as an example of a data network, the present invention contemplates connection to any and all types of public, private, standard, proprietary, wired, wireless, local area, or wide area data networks.

An example of the equipment installed at a typical FBX user premises is further shown in FIG. 1. In this example, the user connects to the data network/Internet 110 using a cable/DSL modem 112. However, the present invention contemplates any data network technology, whether standard or proprietary, local area, or wide area, etc. In this example, the data network/Internet connection is provided to the user's devices over a local area network (LAN) 113 via a residential router 114. Examples of devices that may be connected to the data network include computers 116 and 118, and analog telephone adapter 120. However, the present invention contemplates connection not just of these types of devices, but of any device or type of device that is capable of communicative connection to a data network.

Analog telephone adapter 120 is a device used to connect one or more standard analog telephones to a digital telephone system (such as Voice over IP) or a non-standard telephone system over a data network. Such devices are in commonly used to provide Voice-over-IP (VoIP) telephone service. In this example, analog telephone adapter 120 is communicatively connected to a data network LAN 113 and connects using home analog telephone line 122 to home phones 124, 126, and 128. In this example, home phones 124, 126, and 128 are standard, commonly available, wired 124, 126, and wireless 128, telephone handsets.

Another common example of equipment that may be used is the use of a Multimedia Terminal Adapter (MTA) instead of the cable/DSL modem 112 and analog telephone adapter 120 shown in FIG. 1. An MTA, or E-MTA, is a cable modem and a VoIP adapter combined into a single device. Of course, these are merely examples of suitable devices that may be used, the present invention contemplates implementation using any devices capable of interfacing between telephone handsets and a data network.

Figure 2:
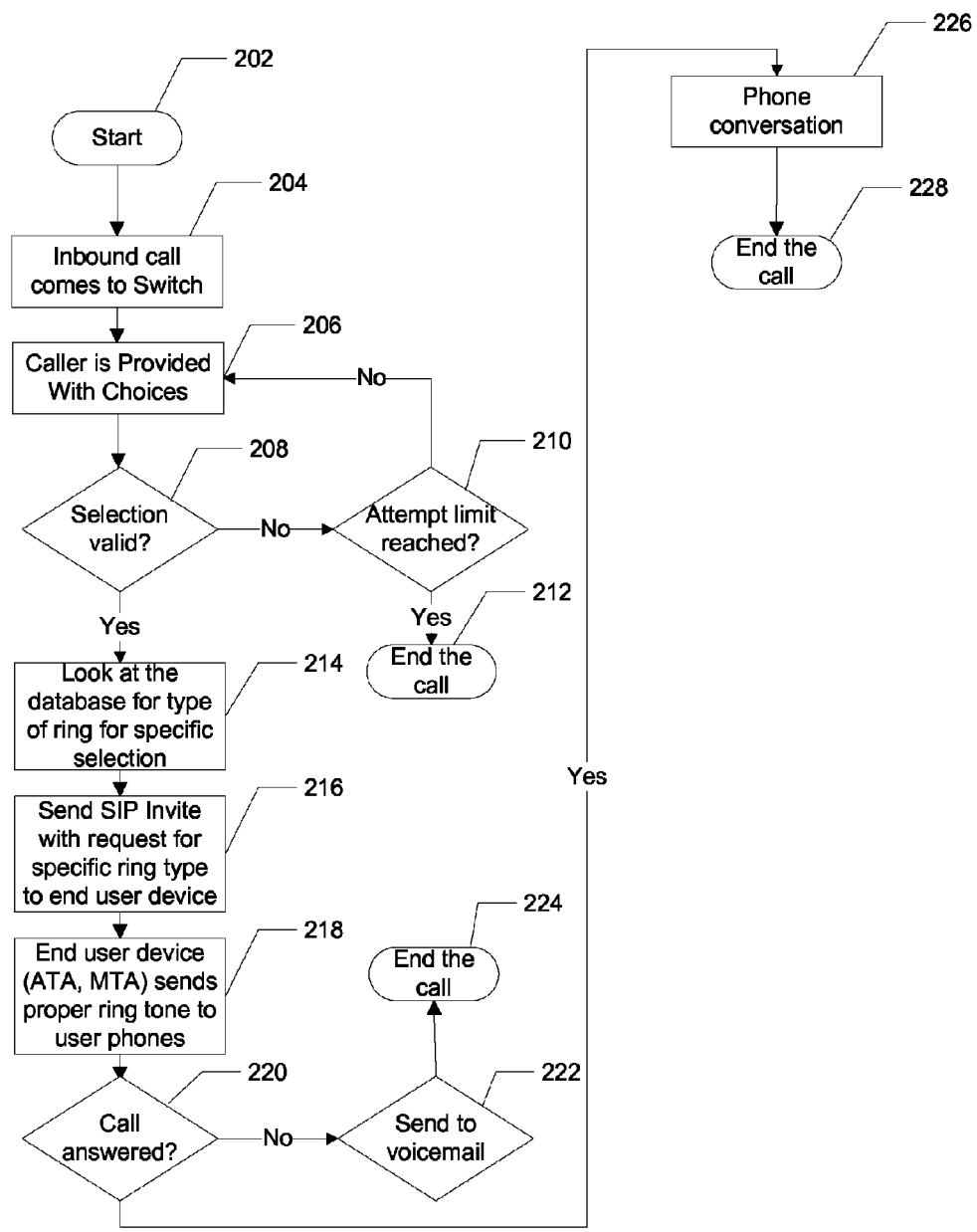
FIG. 2 is an exemplary flow diagram of a process of operation of an FBX distinctive ringing feature.

An exemplary flow diagram of a process of operation 200 of an FBX distinctive ringing feature implemented in the system shown in FIG. 1 is shown in FIG. 2. It is best viewed in conjunction with FIG. 1. Process 200 starts with step 202. In step 204, an inbound call, that is a call from a calling party to a user of FBX, is received at the service provider system 108, such as at a switch. In step 206, the calling party is provided with choices from which to select. For example, the service provider system 108 may play a front end menu message such as: "Thank you for calling the Smith family, for Liz press one, for George press two, for Allen press three or press zero to reach anybody in the household." In step 208, service provider system 108 receives the calling party's selection and determines whether a valid selection was made. For example, if, in response to the above message, the calling party pressed five, this would not be a valid selection. If the calling party's selection is not valid, the process continues with step 210, in which it is determined whether an attempt limit has been reached. If the attempt limit has been reached, the process continues with step 212, in which the call is ended by the service provider system 108, optionally with the playing of a message to the calling party before the call is ended. If the attempt limit has not been reached, the process continues with step 206, in which the calling party is given another attempt to enter a valid selection.

If, in step 208, the calling party enters a valid selection, the process continues with step 214, in which service provider system 108 accesses a database to retrieve the type of ring that corresponds to the selection made. In step 216, a Session Initiation Protocol (SIP) Invite message is sent from service provider system 108 to ATA (or MTA) 120. This SIP Invite message includes data that indicates or requests a specific ring type to ATA (or MTA) 120. In step 218, ATA (or MTA) 120 receives the SIP Invite and, in response, sends the indicated or requested ring tone to the user telephone handsets. In step 220, it is determined whether or not the call was answered. If not, then in step 222, the call is sent to voicemail, and in particular, to the voicemail box of the person selected above. After the voicemail is complete, in step 224 service provider system 108 ends the call. If the call was answered, then in step 226, the phone conversation occurs, and when completed, in step 228 service provider system 108 ends the call.

An example of a SIP Invite message that may be used to indicate or request a specific ring type is:

```
[ SIP ] 05:53:09.058944 ====> 38.102.250.80:7064
INVITE sip:GSHT502-000001*home.voippbxsite.net-
24.13.207.46+6050@38.102.250.80:7064 SIP/2.0
Via: SIP/2.0/UDP 38.102.250.16:5060;branch=z9hG4bK-xcast-
LZEU7fIIIK.1
Via: SIP/2.0/UDP 38.102.250.16:5080;branch=z9hG4bK421a8ac6
Record-Route:
<sip:011972777851748@38.102.250.16:5060;lr;xft=as5e51acd0>
From: "011972777851748"
<sip:011972777851748@38.102.250.16:5080>;tag=as5e51acd0
To: <sip:px-transfertui-12986-12984cXREF-1@38.102.250.16>
Contact: <sip:011972777851748@38.102.250.16:5080>
Call-ID: 0d03cbd30de6c8302bd368cb2e1ea454@38.102.250.16
CSeq: 102 INVITE
User-Agent: SIPTalk Media Server
Content-Type: application/sdp
Content-Length: 377
Date: Fri, 11 Mar 2011 13:53:08 GMT
Allow: INVITE, ACK, CANCEL, OPTIONS, BYE, REFER
X-Reference:
b65b9da978c30cc08155f2eaf7ee1669-5212544@38.102.250.23
Alert-Info: <http://127.0.0.1/Bellcore-dr1>
v=0
o=root 12061 12061 IN IP4 38.102.250.16
s=session
c=IN IP4 38.102.250.16
t=0 0
m=audio 15936 RTP/AVP 0 8 18 4 3 101
a=rtpmap:0 PCMU/8000
a=rtpmap:8 PCMA/8000
a=rtpmap:18 G729/8000
a=rtpmap:4 G723/8000
a=rtpmap:3 GSM/8000
a=rtpmap:101 telephone-event/8000
a=fmtp:101 0-16
a=ptime:20
```

The requested value for ringing is set in the Alert-Info field. Suitable values that may be used to indicate the ring type include: Bellcore-dr0, Bellcore-dr1, . . . . Bellcore-dr7. The standard default phone ringing is 2 seconds on, 4 seconds off. The de-facto industry handling of these values is below:

R0: Distinctive Ringing #0 2 seconds on, 4 seconds off
R1: Distinctive Ringing #1 2 seconds on, 4 seconds off
R2: Distinctive Ringing #2 800 ms on, 400 ms off, 800 ms on, 4 seconds off
R3: Distinctive Ringing #3 400 ms on, 200 ms off, 400 ms on, 200 ms off, 800 ms on, 4 seconds off
R4: Distinctive Ringing #4 300 ms on, 200 ms off, 1 second on, 200 ms of
R5: Distinctive Ringing #5 500 ms on, 5.5 seconds off (not repeated)
R6: Distinctive Ringing #6 2 seconds on, 4 seconds off
R7: Distinctive Ringing #7 2 seconds on, 4 seconds off The ATA/MTA 120 will send proper ring tone to regular analog phones over home phone wiring 128 or directly to the device if it is attached to ATA 120.

As noted above, calls are sent to the voicemail box of the selected recipient of the call. Each member of the household has their own private voicemail box. In addition, the system can be configured so that voicemail can also be delivered to the called party's personal cell phone or another answering device.

Figure 3:
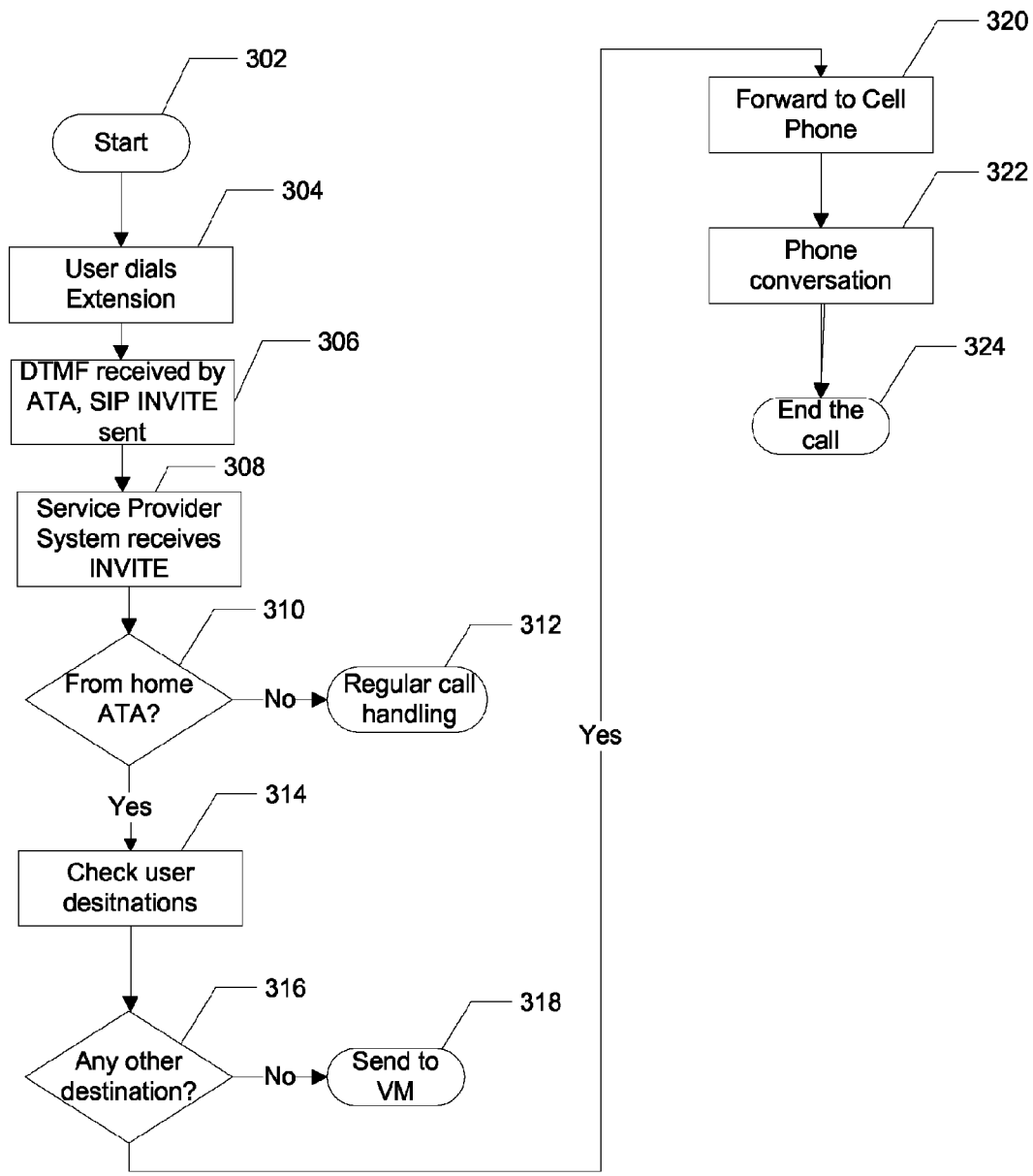
FIG. 3 is an exemplary flow diagram of a process of operation of an FBX auto-call blasting and notification feature.

An exemplary flow diagram of a process of operation 300 of an FBX auto-call blasting and notification feature is shown in FIG. 3. It is best viewed in conjunction with FIG. 1. Process 300 starts with step 302. In step 304, a call is originated from one of the phones 124-128 connected to ATA 120 over home network 113 by a user dialing one of the family home extension numbers. For example, if the desired called party has a home extension number of "3", the user would simply dial 3 on the home phone. As phones 124-128 are regular analog telephones, they output DTMF signals to ATA 120. In step 306, ATA 120 receives the DTMF signals output by the dialed telephone. ATA 120 processes the received DTMF signals, generates a SIP INVITE, and sends the SIP INVITE message to the phone server of service provider system 108. In step 308, service provider system 108 receives the SIP INVITE message. An example of a SIP INVITE message that may be used to indicate a call to a home extension is:

```
INVITE sip:3@home.voippbxsite.net SIP/2.0
Via: SIP/2.0/UDP 38.102.250.80:7064;branch=z9hG4bK-middle-
49870162-1230.0
Via: SIP/2.0/UDP 192.168.10.3:6050;branch=z9hG4bK1778772214;rport
From: "Vlad Smelyansky" <sip:GSHT502-
000001@home.voippbxsite.net>;tag=483642073
To: <sip:3@home.voippbxsite.net>
Contact: <sip:GSHT502-000001*home.voippbxsite.net-
24.13.207.46+6050@38.102.250.80:7064>
Call-ID: 350507642-6050-124@192.168.10.3
CSeq: 1230 INVITE
Max-Forwards: 70
User-Agent: Grandstream HT-502 V1.1B 1.0.1.57
```

The user dialed "3" as shown in the line "INVITE sip: 3@home.voippbxsite.net SIP/2.0." In step 310, service provider system 108 determines whether or not the SIP INVITE message came from the "home" ATA 120. The information in the "From" field, shown in the exemplary message, is sufficient for the service provider system 108 to do a database lookup and determines whether the SIP INVITE was originated by one of the home phones. If the SIP INVITE was not originated by one of the home phones, then in step 312, service provider system 108 performs regular call handling.

If the SIP INVITE was originated by one of the home phones, then in step 314, service provider system 108 checks the user destinations for the called party. Because the call was originated from one of the home phones, there is no need to dial the called party at home. Service provider system 108 does a database lookup to retrieve additional user destinations for the called party. Examples of additional user destinations include cell phone numbers, work numbers, VOIP phone network addresses or network names, etc. In step 316, service provider system 108 determines whether there are any other user destinations. If there are none, then in step 318, the call is sent to voicemail. In this case, the feature can be used as a short cut to leave a message for another family member. If, in step 316, it is determined that there are other user destinations, such as a cell phone in this example, then in step 320, the call is forwarded to that cell phone. An example of a SIP INVITE message that may be used to forward the call is:

```
[ SIP ] 07:10:48.830267 ====> 38.102.250.50:5060
INVITE sip:184784008207@38.102.250.50:5060 SIP/2.0
Via: SIP/2.0/UDP 38.102.250.16:5060;branch=z9hG4bK-xcast-
8MPKm4iWhk.0
Via: SIP/2.0/UDP 38.102.250.80:7064;branch=z9hG4bK-middle-
49870162-1231.0
Via: SIP/2.0/UDP 192.168.10.3:6050;branch=z9hG4bK197304559;rport
Record-Route: <sip:GSHT502-000001@38.102.250.16:5060;lr;xft=
483642073>
From: "Anna Figman" <sip:8474858107@home.voippbxsite.net>;tag=
483642073
To: <sip:3@home.voippbxsite.net>
Contact: <sip:GSHT502-000001*home.voippbxsite.net-
24.13.207.46+6050@38.102.250.80:7064>
Call-ID: 350507642-6050-124@192.168.10.3
CSeq: 1231 INVITE
Max-Forwards: 69
P-Asserted-Identity: "Vlad Smelyansky" <sip:GSHT502-
000001@home.voippbxsite.net>
Supported: replaces, path, timer
User-Agent: Grandstream HT-502 V1.1B 1.0.1.57
```

The forwarding of the call is similar to the handling of regular call. In step 322, the phone conversation occurs, and in step 324, the call is ended.

Conventional home phone voicemail service is designed around an answering machine. When somebody leaves a message, it is accessible to all members of the household. Often that the wrong member of the household gets the message and the proper person even doesn't even know about the message. Existing business PBX solutions offer individual private voicemail. The indication of a new VM is usually displayed on the phone device with a Message Waiting Indicator (MWI) and/or stutter tone on the phone. The problem is that each device is associated with one extension/person, while in the home, all telephone devices are shared.

The FBX solution to this problem has two parts. One part involves setting the MWI if any user in the family has a new voicemail message, the other is a unified voicemail announcement that indicates which users have new voicemail messages. In the FBX solution, the MWI is set whenever there is a new voicemail message in any mailbox of any user associated with the user premises. This is in contrast to the traditional PBX, in which an indicator is set only on the phone associated with the mailbox that has a new message.

Figure 4:
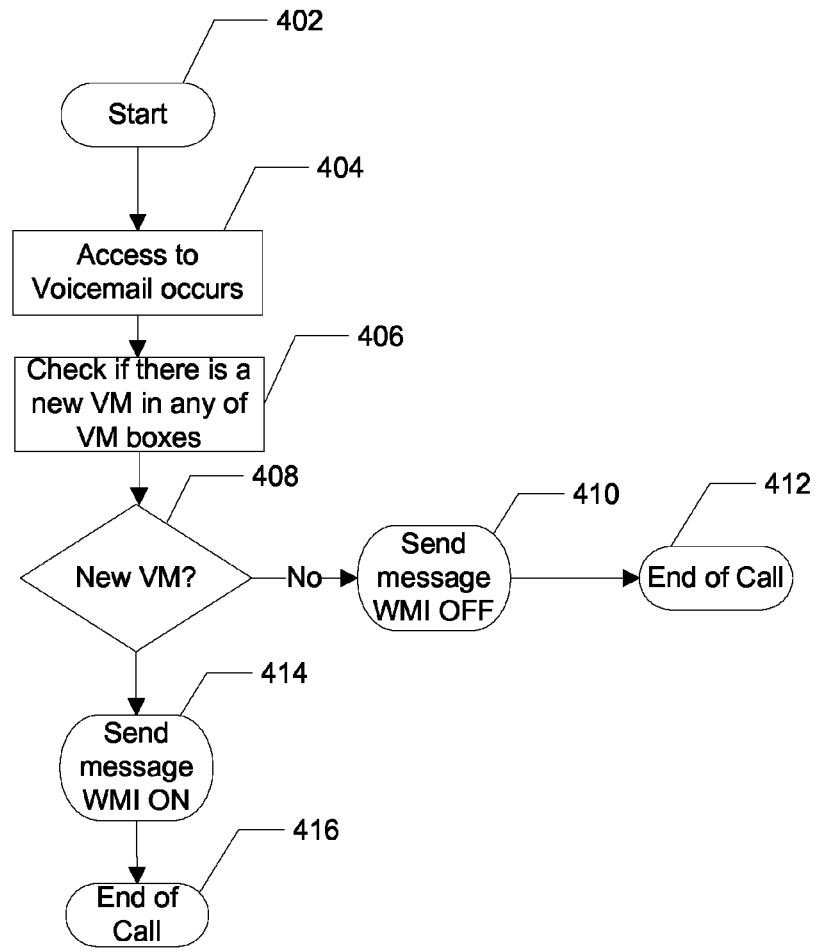
FIG. 4 is an exemplary flow diagram of a process of operation of an FBX MWI feature.

An exemplary flow diagram of a process of operation 400 of an FBX MWI feature is shown in FIG. 4. It is best viewed in conjunction with FIG. 1. Process 400 starts with step 402. In step 404, a user associated with an account accesses voicemail. The voicemail access may be the user checking for voicemail messages, leaving a voicemail message, changing their greeting, etc. In step 406, service provider system 108 checks to determine whether there is a new voicemail message in any voicemail box of any user associated with the user premises associated with that account. In step 408, if there are no new voicemail messages in any voicemail box of any user associated with the user premises, then, in step 410, service provider system 108 sends a WMI OFF message, and in step 412, the call may then end. In step 408, if there is at least one new voicemail message in any voicemail box of any user associated with the user premises, then, in step 414, service provider system 108 sends a WMI ON message, and in step 416, the call may then end. An example of a WMI ON message that may be used is:

```
NOTIFY sip:2940D01L01@192.168.1.3:25060 SIP/2.0
Via: SIP/2.0/UDP 38.102.250.80:7060;branch=z9hG4bK-middle-
49740858-101652.0
Via: SIP/2.0/UDP
38.102.250.16:5060;branch=z9hG4bK-xcast-
FLHKONgFFM.U;received=38.102.250.93
From: "2940D01L01"
<sip:2940D01L01@smith.familypbxs.net>;tag=mwi-4141202960
To: "2940D01L01" <sip:2940D01L01@smith.familypbxs.net>
Call-ID: 27a02a1151e70967e13b4073a2db67d9
CSeq: 101652 NOTIFY
Max-Forwards: 69
User-Agent: XCast VGProxy/1.2
Content-Type: application/simple-message-summary
Content-Length: 43
Event: message-summary
Messages-Waiting: yes
Voice-Message: 5/0
```

An example of a WMI OFF message that may be used is:

```
NOTIFY sip:114D01L01@10.202.218.207:39197 SIP/2.0
Via: SIP/2.0/UDP 38.102.250.80:7060;branch=z9hG4bK-middle-
49740679-4507.0
Via: SIP/2.0/UDP
38.102.250.16:5060;branch=z9hG4bK-xcast-
GGNJEMErDL.U;received=38.102.250.93
From: "Greg Behymer" <sip:114D01L01@cmi.familypbxs.net>;tag=mwi-
4139794840
To: "Greg Behymer" <sip:114D01L01@cmi.familypbxs.net>
Call-ID: 55a24ddbb2647aaf2b07ec84ddad87ff
CSeq: 4507 NOTIFY
Max-Forwards: 69
User-Agent: XCast VGProxy/1.2
Content-Type: application/simple-message-summary
Content-Length: 42
Event: message-summary
Messages-Waiting: no
Voice-Message: 0/2
```

The second part of the FBX solution to the voicemail problem is a unified voicemail announcement that indicates which users have new voicemail messages. Currently there are multiple voicemail boxes connected to the single phone line. When there is a new voicemail, the MWI indicates that there is a new voicemail message, but the users do not know which particular users have voicemail. Each user has to login into their personal voicemail account to determine whether there are any new voicemail messages for them. The FBX solution is a unified voicemail announcement that indicates which users have new voicemail messages.

Figure 5:
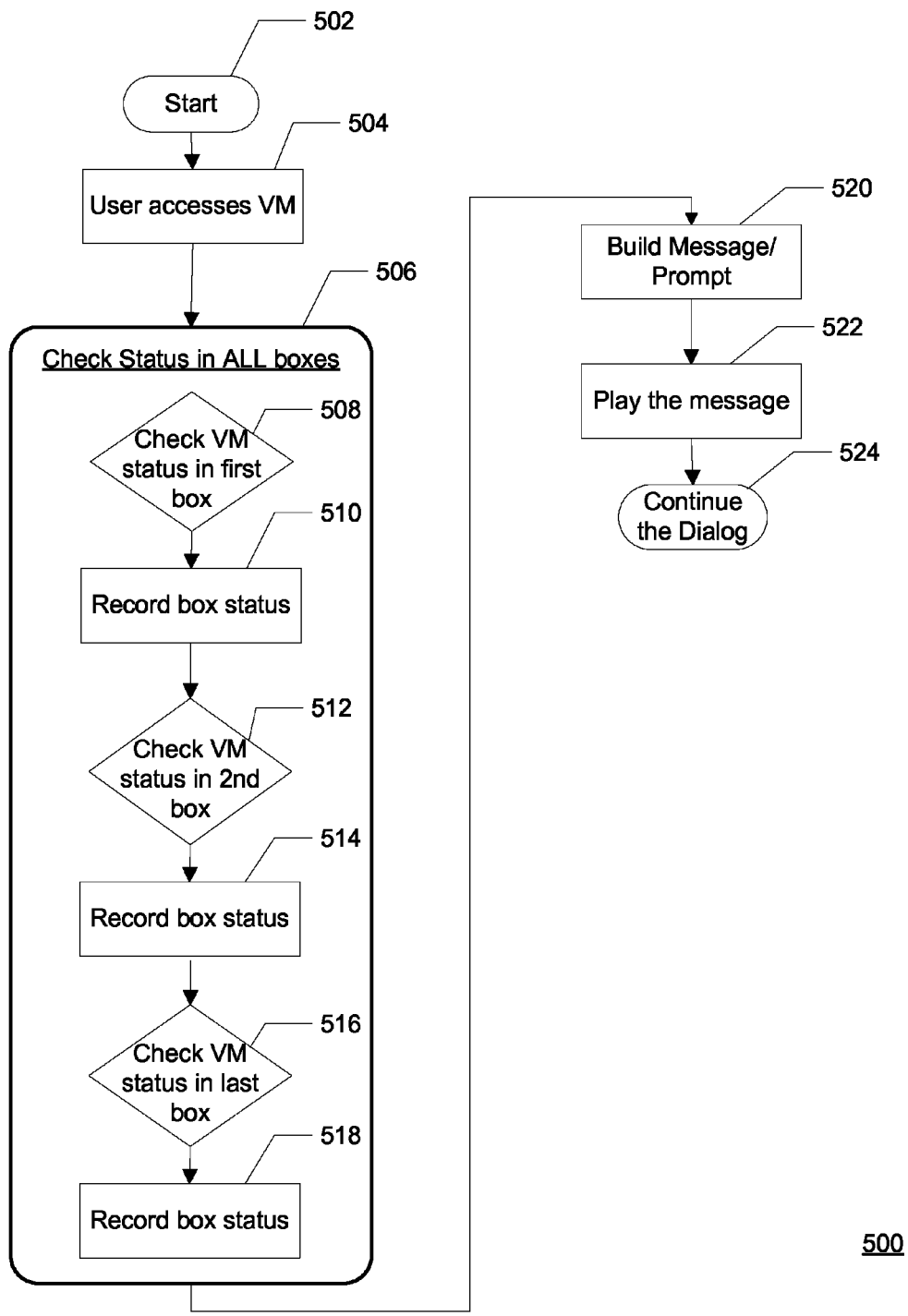
FIG. 5 is an exemplary flow diagram of a process of operation of an FBX unified voicemail announcement feature.

An exemplary flow diagram of a process of operation 500 of an FBX unified voicemail announcement feature is shown in FIG. 5. It is best viewed in conjunction with FIG. 1. Process 500 starts with step 502. In step 504, a user accesses voicemail. In step 506, the statuses of all voicemail boxes are checked to determine a number of new voicemail messages in each voicemail box, and optionally, the number of old and/or saved messages in each voicemail box. For example, in step 508, the status of a first voicemail box is checked to determine the number of new voicemail messages in that box. Optionally, the number of old and/or saved messages may also be determined. In step 510, the status of the first voicemail box is recorded. In step 512, the status of a second voicemail box is checked to determine the number of new (and/or old or saved) voicemail messages in that box. In step 514, the status of the second voicemail box is recorded. The statuses of all voicemail boxes are checked and recorded until, in step 516, the status of the last voicemail box is checked to determine the number of new (and/or old or saved) voicemail messages in that box. In step 518, the status of the last voicemail box is recorded. In step 520, a voice message/prompt is built using the recorded status of the voicemail boxes. The voice message indicates which voicemail boxes have new messages, and optionally, may indicate the presence, absence, and number of new, old, and saved messages in each voicemail box. In step 522, the message is played to the user. In step 524, the voicemail dialog continues. For example, if the user has new voicemail messages, they may login and listen to those messages.

Figure 6:
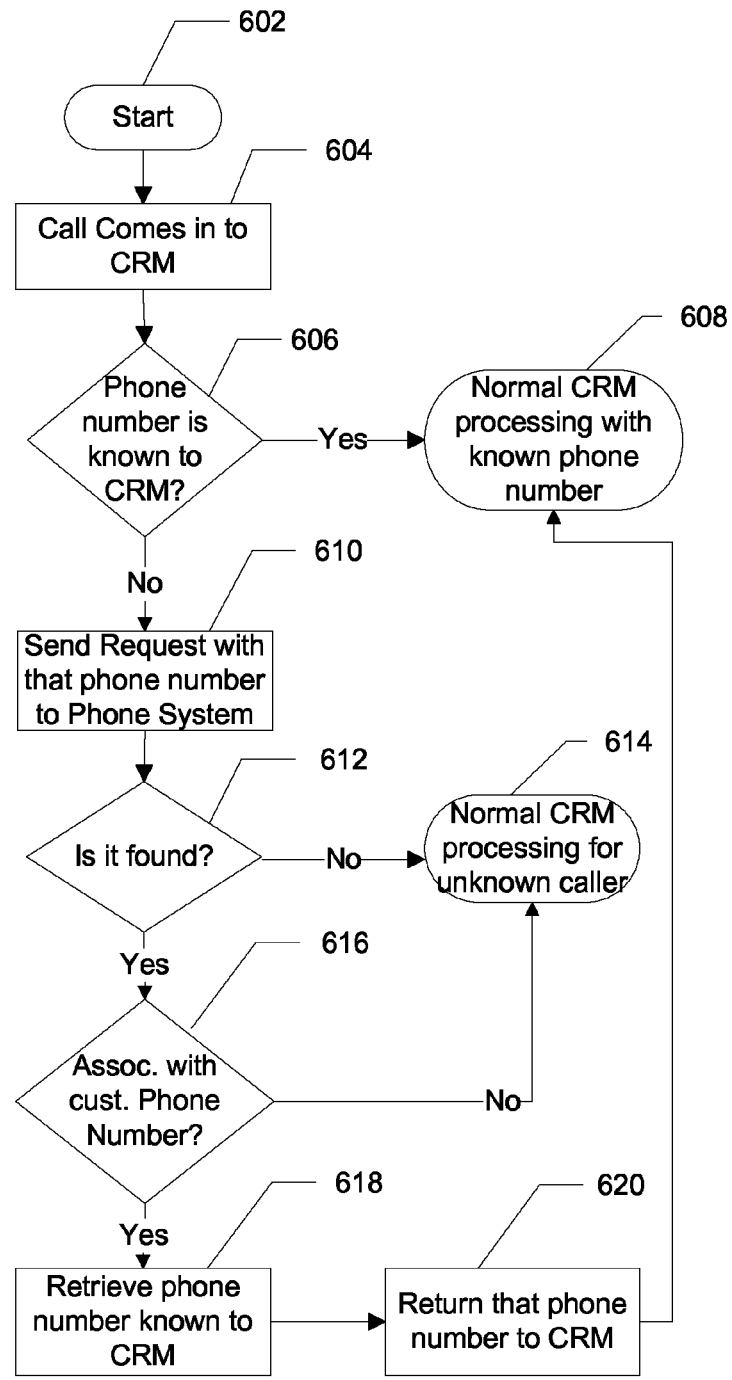
FIG. 6 is an exemplary flow diagram of a process of operation of an FBX CRM feature.

FBX encourages usage of call-blast and, as a result, user's cell phone numbers are stored in service provider system 108. When phone system is not working, users will use their cell phones to the call service provider to report the trouble. The FBX Customer Relations Management (CRM) feature automatically provides the service provider customer representatives with family information, even though the family phone was not used to place the call. An exemplary flow diagram of a process of operation 600 of an FBX CRM feature is shown in FIG. 6. It is best viewed in conjunction with FIG. 1. Process 600 starts with step 602. In step 604, the CRM system of the service provider receives a call from a user. In step 606, the CRM system performs a lookup in a database to determine whether the phone number of the calling party is known. If the calling party's phone number is found in the database, the number is known to the CRM and in step 608, normal CRM processing is performed using the known phone number. For example, the system may provide a CRM agent with already populated customer information.

If, in step 606, the calling party's phone number is not found in the database, then in step 610, the CRM system sends a request to service provider system 108, including the phone number of the calling party. In step 612, service provider system 108 performs a lookup in a database to determine whether the phone number of the calling party is associated with a user of the system. If the calling party's phone number is not found in the database, the number is unknown to service provider system 108 and to the CRM system and in step 614, normal CRM processing for an unknown caller is performed. For example, the system may prompt the caller to supply information, or a CRM agent may request information from the caller.

If the calling party's phone number is found in the database, the number is known to service provider system 108 and in step 614, it is determined whether the calling party's phone number is associated with a customer phone number. For example, the calling party's phone number may be one of the destinations in a customer call blast list. If the calling party's phone number is not associated with a customer phone number, then in step 614, normal CRM processing for an unknown caller is performed. If the calling party's phone number is associated with a customer phone number, then in step 618, the customer phone number is retrieved and in step 620, the customer phone number is sent to the CRM system. In step 608, the customer phone number is used to perform normal CRM processing using the known phone number.

Additional features may be provided by the FBX system. For example, enhanced call waiting features may be provided. In conventional call waiting, a party may receive an incoming call while they are talking on another call. The current options are: ignore the incoming call, take the incoming call, and ask to call back, or offer apologies to the current call and switch to the other line. However, often the incoming call is a call that is intended for someone else in the same household. With the FBX innovation, the standard front end menu message is played to the incoming caller, and if the call is intended for a person other than the person who is currently on the phone, the call may be forwarded to the cell phone or other number of the intended recipient of the call. In this way, the specific person for whom the call is intended will be able to answer the call on a cell phone or other answering device, such as a computer, without interruption of the conversation going on with the original called party.

As another example, enhanced call screening features may be provided. Many people do not like to receive unsolicited calls, like polls, request for donations, etc. Most call centers make these calls by using predictive dialers. In the FBX system, a dialer will hit a FBX prompt, which will confuse the dialer, and the call will be terminated. This front end menu will protect privacy better than any privacy protection available from existing providers.

Figure 7:
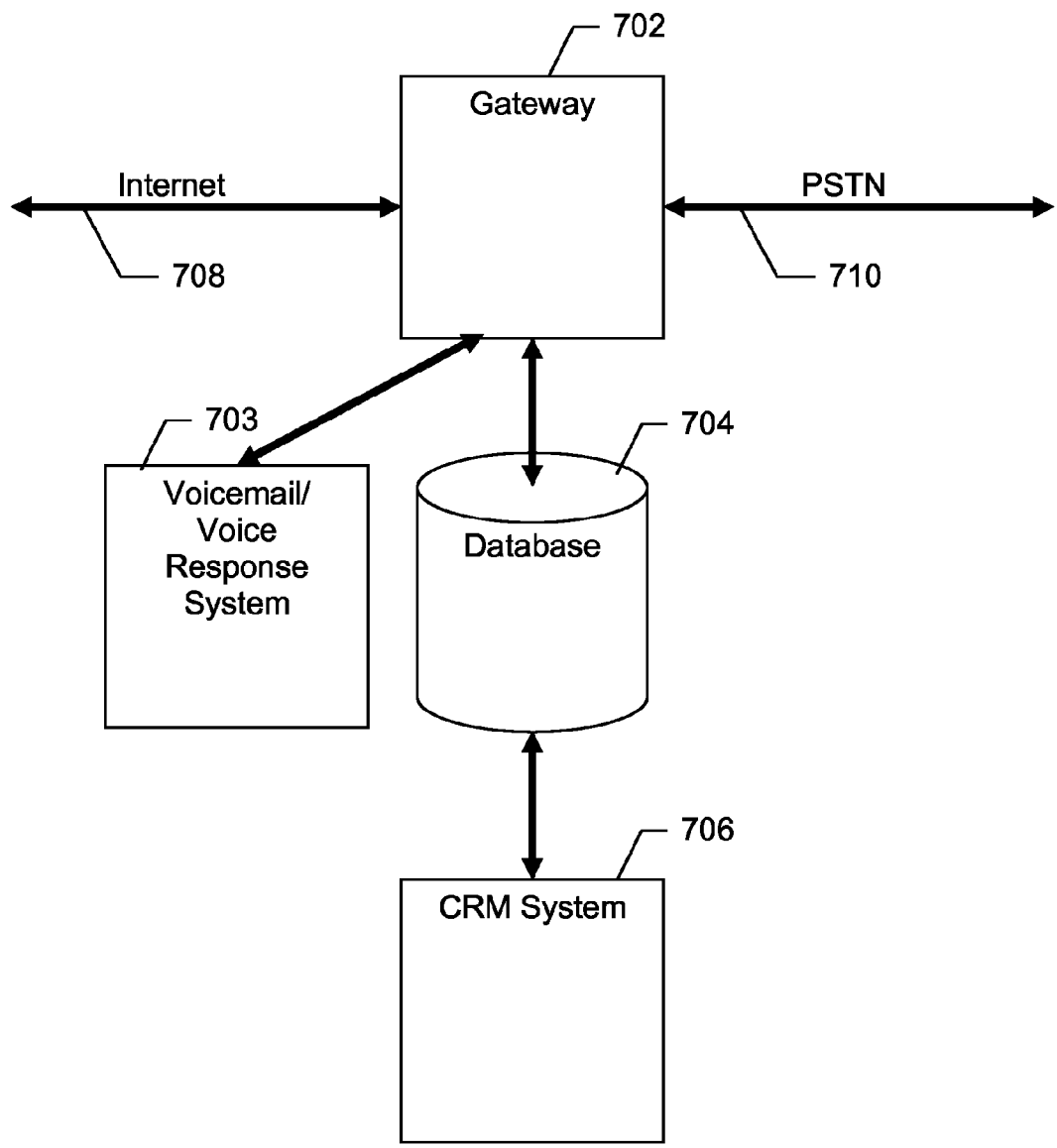
FIG. 7 is an exemplary block diagram of a service provider system shown in FIG. 1.

An exemplary block diagram of a service provider system 108, shown in FIG. 1, is shown in FIG. 7. Service provider system 108 includes Gateway System 702, Voicemail/Voice Response System 703, Database System 704, and CRM System 706. Gateway System 702 is connected to the Internet 708, and/or one or more other data communication networks, such as any public or proprietary LAN or WAN. Gateway System 702 is also connected to the Public Switched Telephone Network (PSTN) 710. Gateway System 702 is a network device which converts voice and fax calls, in real time, between a data network 708 and PSTN 710. Voicemail/Voice Response System 703 plays messages to and accepts user input from callers to users of the FBX system and to users of the FBX system. Database System 704 stores information about users of the FBX system, such as ring types, telephone numbers, call blast numbers, etc. CRM System 706 includes information about users of the FBX system, as well as providing live and/or automated support to users of the FBX system.

Figure 8:
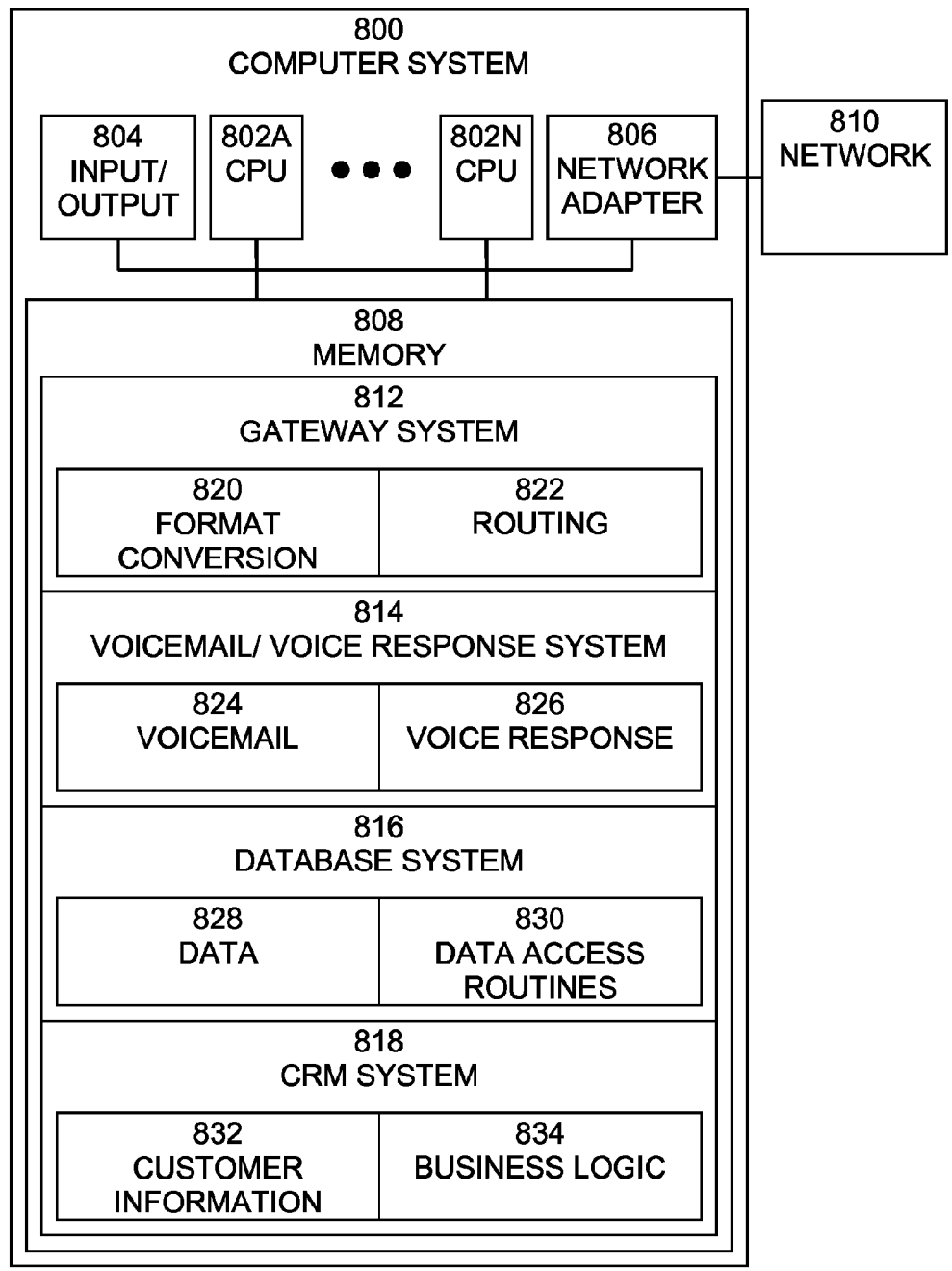
FIG. 8 is an exemplary block diagram of a computer system that may be used to implement the one or more of the systems shown in FIG. 7.

An exemplary block diagram of a computer system 800 that may be used to implement the one or more of the systems shown in FIG. 7, such as Gateway System 702, Voicemail/Voice Response System 703, Database System 704, or CRM System 706 is shown in FIG. 8. Computer system 800 is typically a programmed general-purpose computer system, such as a personal computer, workstation, server system, and minicomputer or mainframe computer. Computer system 800 includes one or more processors (CPUs) 802A-802N, input/output circuitry 804, network adapter 806, and memory 808. CPUs 802A-802N execute program instructions in order to carry out the functions of the present invention. Typically, CPUs 802A-802N are one or more microprocessors, such as an INTEL PENTIUM® processor. FIG. 8 illustrates an embodiment in which computer system 800 is implemented as a single multi-processor computer system, in which multiple processors 802A-802N share system resources, such as memory 808, input/output circuitry 804, and network adapter 806. However, the present invention also contemplates embodiments in which computer system 800 is implemented as a plurality of networked computer systems, which may be single-processor computer systems, multi-processor computer systems, or a mix thereof.

Input/output circuitry 804 provides the capability to input data to, or output data from, computer system 800. For example, input/output circuitry may include input devices, such as keyboards, mice, touchpads, trackballs, scanners, etc., output devices, such as video adapters, monitors, printers, etc., and input/output devices, such as, modems, etc. Network adapter 806 interfaces device 800 with a network 810. Network 810 may be any public or proprietary LAN or WAN, including, but not limited to the Internet, and/or the PSTN or other telephone network.

Memory 808 stores program instructions that are executed by, and data that are used and processed by, CPU 802 to perform the functions of computer system 800. Memory 808 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or Serial Advanced Technology Attachment (SATA), or a variation or enhancement thereof, or a fiber channel-arbitrated loop (FC-AL) interface.

The contents of memory 808 varies depending upon the function that computer system 800 is programmed to perform. In the example shown in FIG. 8, memory 808 includes, examples of memory contents that would be included in a Gateway System 812, a Voicemail/Voice Response System 814, a Database System 816, or a CRM System 818 are shown. However, one of skill in the art would recognize that these functions, along with the memory contents related to those functions, may be included on one system, or may be distributed among a plurality of systems, based on well-known engineering considerations. The present invention contemplates any and all such arrangements.

In the example of memory contents included in a Gateway System 812, there are format conversion routines, for converting PSTN format data to data network format data, and vice versa, and routing routines, for routing calls and other transmissions. Of course, Gateway Systems typically have other well-known functions that are not shown, which may be implemented in software, hardware, or combinations of hardware and software. In the example of Voicemail/Voice Response System 814, there are voicemail routines 824, for receiving, storing, and sending voicemail messages, and voice response routines 826, for interacting with persons by playing messages and accepting input. Of course, Voicemail/Voice Response Systems typically have other well-known functions that are not shown, which may be implemented in software, hardware, or combinations of hardware and software. In the example of Database System 816, there are data store 828, which stores the data in the database, and data access routines 830, for storing data into and retrieving data from data store 828. Of course, Database Systems typically have other well-known functions that are not shown, which may be implemented in software, hardware, or combinations of hardware and software. In the example of CRM System 818, there are customer information 832, which stores the information about customers, and business logic routines 834, which implement billing, provisioning, support, and other customer related functions. Of course, CRM Systems typically have other well-known functions that are not shown, which may be implemented in software, hardware, or combinations of hardware and software. Also not shown is the operating system that provides overall computer system functionality.

As shown in FIG. 8, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

Figure 9:
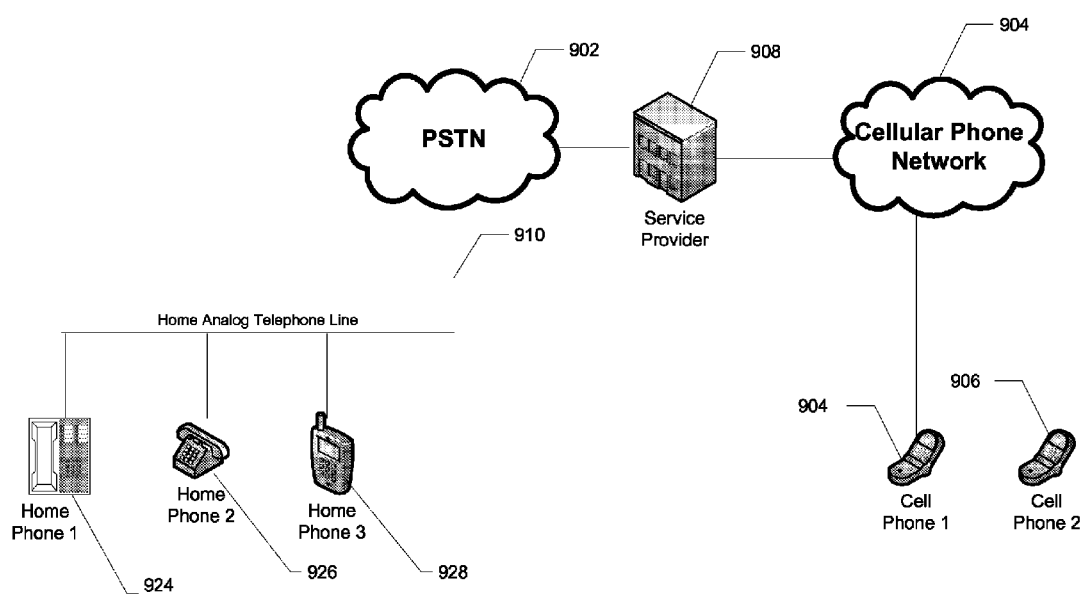
FIG. 9 is an exemplary block diagram of a system in which FBX may be implemented.

An exemplary system 900, in which FBX may be implemented, is shown in FIG. 9. In this example, FBX functionality is provided over a traditional PSTN network 902 with no need for any data (Internet) type of services or any additional equipment on customer premises. System 900 includes telephone networks, such as the Public Switched Telephone Network (PSTN) 902 and Cellular Phone Network 904. PSTN 902 and Cellular Phone Network 904 together include any and all publicly available telecommunications networks, including analog and digital wired telecommunications networks and analog and digital wireless telecommunications networks.

In this example, PSTN 902 provides communicative connectivity to phones located at the user premises, such as Home Phones 924-928, over Home Analog Telephone Line 910. Home Analog Telephone Line 910 is typically connected to a phone line that comes from a PSTN central office, which is part of PSTN 902. Cellular Phone Network 904 provides communicative connectivity to wireless mobile phones, such as Cell Phones 904 and 906. Cell Phones 904 and 906 may be at any location, but are associated with users at the user premises. Communicatively connected to PSTN 902 and Cellular Phone Network 904 is service provider system 908, which, in this example, is used to provide the FBX functionality. Service provider system 908 may include apparatus such as telephone switches, gateways, etc. Service provider system 908 may be operated by a PSTN or cellular telephone operating company, or by an independent operator. In addition, service provider system 908 may be implemented in or co-located in a central office of PSTN 902 or equivalent facility of Cellular Phone Network 904, or service provider system 908 may be implemented remotely. The present invention contemplates any and all implementations or locations of service provider system 908.

Figure 10:
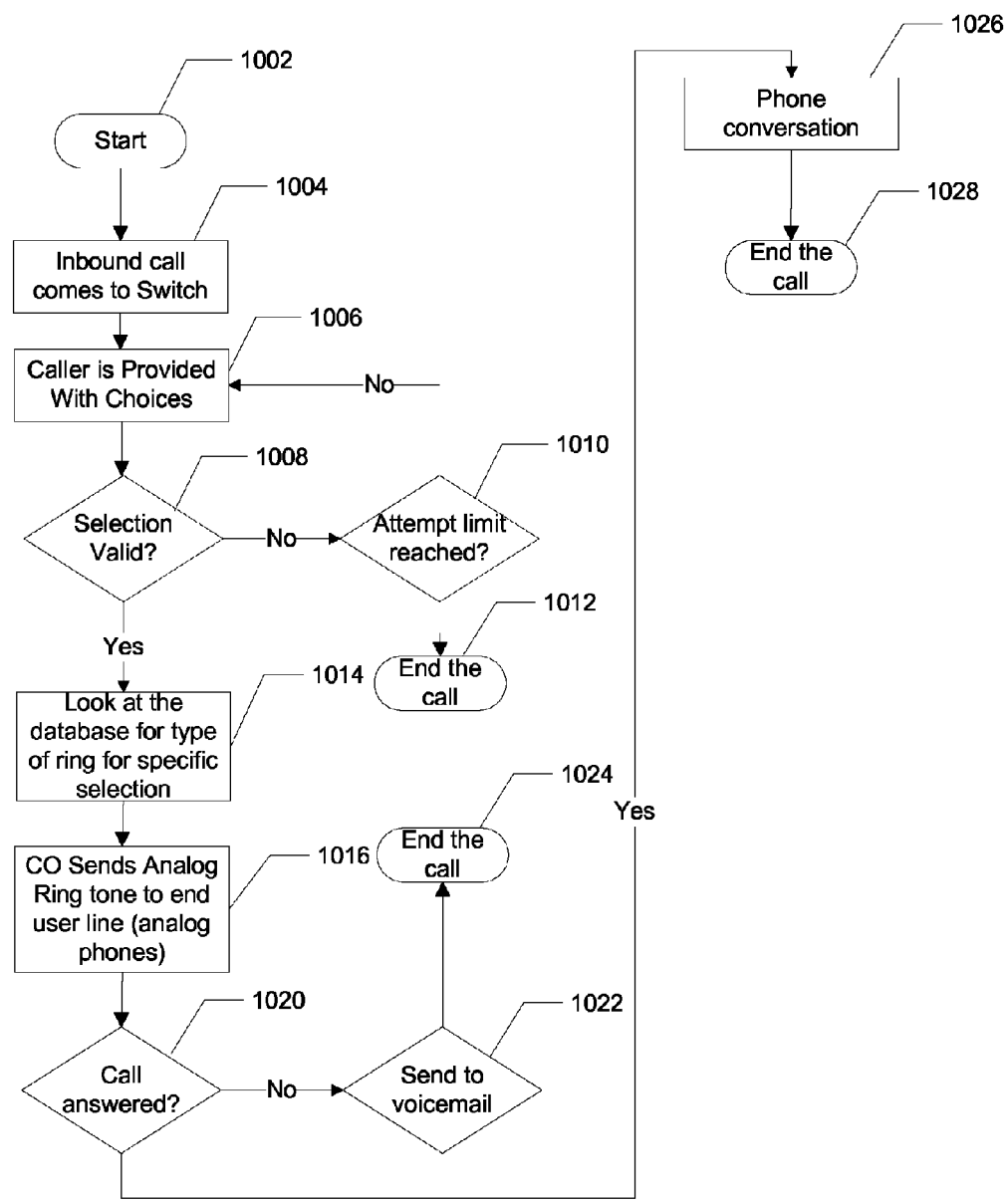
FIG. 10 is an exemplary flow diagram of a process of operation of an FBX distinctive ringing feature implemented in the system shown in FIG. 9.

An exemplary flow diagram of a process of operation 1000 of an FBX distinctive ringing feature implemented in the system shown in FIG. 9 is shown in FIG. 10. It is best viewed in conjunction with FIG. 9. Process 1000 starts with step 1002. In step 1004, an inbound call, that is a call from a calling party to a user of FBX, is received at the service provider system 908, such as at a switch, which may be part of or located in a PSTN central office, or which may be separate or remote from the PSTN central office. In step 1006, the calling party is provided with choices from which to select. For example, the service provider system 908 may play a front end menu message such as: "Thank you for calling the Smith family, for Liz press one, for George press two, for Allen press three or press zero to reach anybody in the household." In step 1008, service provider system 908 receives the calling party's selection and determines whether a valid selection was made. For example, if, in response to the above message, the calling party pressed five, this would not be a valid selection. If the calling party's selection is not valid, the process continues with step 1010, in which it is determined whether an attempt limit has been reached. If the attempt limit has been reached, the process continues with step 1012, in which the call is ended by the service provider system 908, optionally with the playing of a message to the calling party before the call is ended. If the attempt limit has not been reached, the process continues with step 1006, in which the calling party is given another attempt to enter a valid selection.

If, in step 1008, the calling party enters a valid selection, the process continues with step 1014, in which service provider system 908 accesses a database to retrieve the type of ring that corresponds to the selection made. In step 1016, service provider system 908 causes a central office of PSTN 902 to send the selected analog ring tone to Home Analog Telephone Line 910. This causes Home Phones 924-928 to ring with the selected ring tone. Service provider system 908 communicates with the PSTN central office using signaling or messaging that depends upon the implementation of the system. For example, if service provider system 908 is part of or located in a PSTN central office, the signaling or messaging used may differ from the signaling or messaging used if service provider system 908 is separate or remote from the PSTN central office.

In step 1020, it is determined whether or not the call was answered. If not, then in step 1022, the call is sent to voicemail, and in particular, to the voicemail box of the person selected above. After the voicemail is complete, in step 1024 service provider system 908 ends the call. If the call was answered, then in step 1026, the phone conversation occurs, and when completed, in step 1028 service provider system 908 ends the call.

Figure 11:
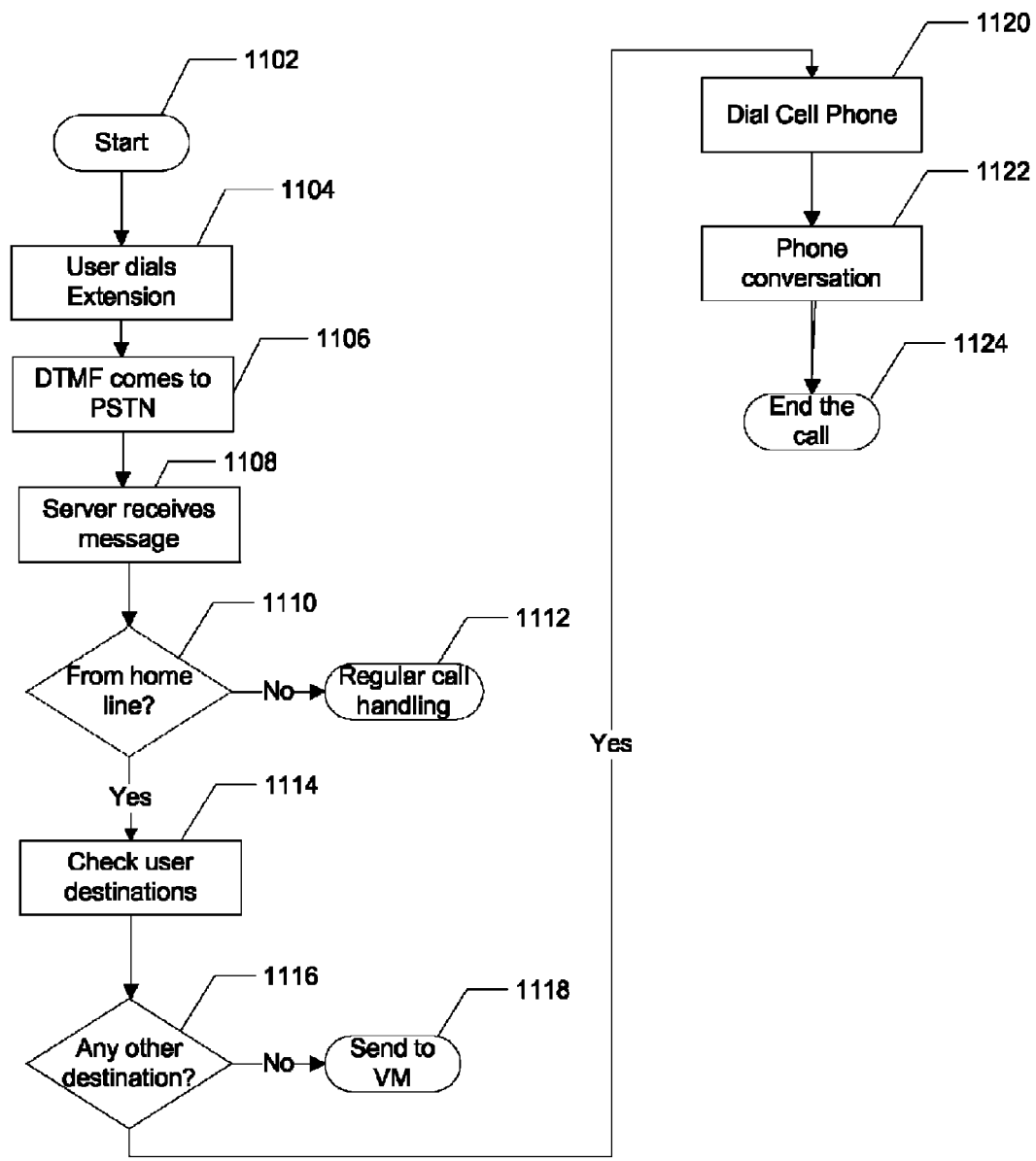
FIG. 11 is an exemplary flow diagram of a process of operation of an FBX auto-call blasting and notification feature implemented in the system shown in FIG. 9.

An exemplary flow diagram of a process of operation 1100 of an FBX auto-call blasting and notification feature is shown in FIG. 11. It is best viewed in conjunction with FIG. 9. Process 1100 starts with step 1102. In step 1104, a call is originated from one of the phones 924-928 connected to PSTN 902 over Home Analog Telephone Line 910 by a user dialing one of the family home extension numbers. For example, if the desired called party has a home extension number of "3", the user would simply dial 3 on the home phone. As phones 924-928 are regular analog telephones, they output DTMF signals to PSTN 902. In step 1106, PSTN 902 receives the DTMF signals output by the dialed telephone. PSTN 902 processes the received DTMF signals, generates a message indicating a call to a home extension, and sends the message to the phone server of service provider system 908. In step 1108, service provider system 908 receives the message. The type and format of the message depends upon how service provider system 908 is implemented. For example, service provider system 908 may implemented in or co-located in a central office of PSTN 902, or equivalent facility of Cellular Phone Network 904, or service provider system 908 may be implemented remotely. Messages types that may be used included Signaling System 7 (SS7) messages, SIP messages, or other standard or proprietary message types or formats. The present invention contemplates any and all such message types and formats.

In step 1110, service provider system 908 determines whether or not the call came from the Home Analog Telephone Line 910. The information in the message is sufficient for the service provider system 908 to do a database lookup and determines whether the call was originated by one of the home phones. If the call was not originated by one of the home phones, then in step 1112, service provider system 908 performs regular call handling.

If the call was originated by one of the home phones, then in step 1114, service provider system 908 checks the user destinations for the called party. Because the call was originated from one of the home phones, there is no need to dial the called party at home. Service provider system 908 does a database lookup to retrieve additional user destinations for the called party. Examples of additional user destinations include cell phone numbers, work numbers, VOIP phone network addresses, or network names, etc. In step 1116, service provider system 908 determines whether there are any other user destinations. If there are none, then in step 1118, the call is sent to voicemail. In this case, the feature can be used as a short cut to leave a message for another family member. If, in step 1116, it is determined that there are other user destinations, such as a cell phone in this example, then in step 1120, the call is forwarded to that cell phone. The forwarding of the call is similar to the handling of regular call. In step 1122, the phone conversation occurs, and in step 1124, the call is ended.

It is important to note that while the present invention has been described in the context of a fully functioning data processing system, those of ordinary skill in the art will appreciate that the processes of the present invention are capable of being distributed in the form of a computer program product including a computer readable medium of instructions. Examples of non-transitory computer readable media include storage media, examples of which include, but are not limited to, floppy disks, hard disk drives, CD-ROMs, DVD-ROMs, RAM, and flash memory.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of providing distinctive ringing comprising:
   receiving, at a service provider system connected to a telephone network, a call from a calling party to a user of the service provider system;
   playing, from the service provider system to the calling party, a message indicating a plurality of choices from which to select;
   receiving, at the service provider system, the calling party's selection; and
   transmitting, from the service provider system, a Session Initiation Protocol INVITE message indicating a Bellcore Distinctive Ringing ring type to be used based on the calling party's selection.

2. The method of claim 1, wherein the received call is received at the service provider system from the telephone network.

3. The method of claim 1, wherein the plurality of choices from which to select represent a plurality of people.

4. The method of claim 1, wherein the service provider system is further connected to a data network.

5. The method of claim 4, wherein the received call is received at the service provider system from the data network.

6. The method of claim 4, wherein the plurality of choices from which to select represent a plurality of people.

7. The method of claim 4, wherein the Session Initiation Protocol INVITE message indicating a ring tone or ring type is transmitted over the data network to an adapter that connects an analog telephone line to the data network.

8. The method of claim 1, wherein the transmitting step further comprises transmitting the Session Initiation Protocol INVITE message to a plurality of user destinations based on the calling party's selection.

9. The method of claim 1, wherein the Session Initiation Protocol INVITE message includes an Alert-Info header indicating the ring tone or ring type to be used based on the calling party's selection.

10. The method of claim 1, wherein the call from the calling party is placed by a first user of the service provider system, the choice selected by the calling party represents another user of the service provider system, and the transmitting step further comprises transmitting the Session Initiation Protocol INVITE message to a plurality of user destinations for the other user of the service provider system.

11. A computer program product for providing distinctive ringing comprising:
a non-transitory computer readable medium;
computer program instructions, recorded on the non-transitory computer readable medium, executable by a processor, for performing the steps of:
receiving, at a service provider system connected to a data network and to a telephone network, a call from a calling party to a user of the service provider system;
playing, from the service provider system to the calling party, a message indicating a plurality of choices from which to select;
receiving, at the service provider system, the calling party's selection; and
transmitting, from the service provider system, a Session Initiation Protocol INVITE message indicating a Bellcore Distinctive Ringing ring type to be used based on the calling party's selection.

12. The computer program product of claim 11, wherein the received call is received at the service provider system from the telephone network.

13. The computer program product of claim 11, wherein the plurality of choices from which to select represent a plurality of people.

14. The computer program product of claim 11, wherein the service provider system is further connected to a data network.

15. The computer program product of claim 14, wherein the received call is received at the service provider system from the data network.

16. The computer program product of claim 14, wherein the plurality of choices from which to select represent a plurality of people.

17. The computer program product of claim 14, wherein the Session Initiation Protocol INVITE message indicating a ring tone or ring type is transmitted over the data network to an adapter that connects an analog telephone line to the data network.

18. A system for providing distinctive ringing comprising:
a service provider system connected to a data network and to a telephone network operable to:
receive a call from a calling party to a user of the service provider system; play, to the calling party, a message indicating a plurality of choices from which to select;
receive the calling party's selection; and
transmit a Session Initiation Protocol INVITE message indicating a Bellcore Distinctive Ringing ring type to be used based on the calling party's selection.

19. The system of claim 18, wherein the plurality of choices from which to select represent a plurality of people.

20. The system of claim 18, wherein the service provider system is further connected to a data network.

21. The system of claim 20, wherein the received call is received at the service provider system from the telephone network.

22. The system of claim 20, wherein the received call is received at the service provider system from the data network.

23. The system of claim 20, wherein the plurality of choices from which to select represent a plurality of people.

24. The system of claim 20, wherein the Session Initiation Protocol INVITE message indicating a ring tone or ring type is transmitted over the data network to an adapter that connects an analog telephone line to the data network.

* * * * *